G. C. JETT.
DIFFERENTIAL MECHANISM.
APPLICATION FILED OCT. 31, 1918.

1,423,941.

Patented July 25, 1922.
2 SHEETS—SHEET 1.

Inventor:
George C. Jett
By Ira Wilson Atty.

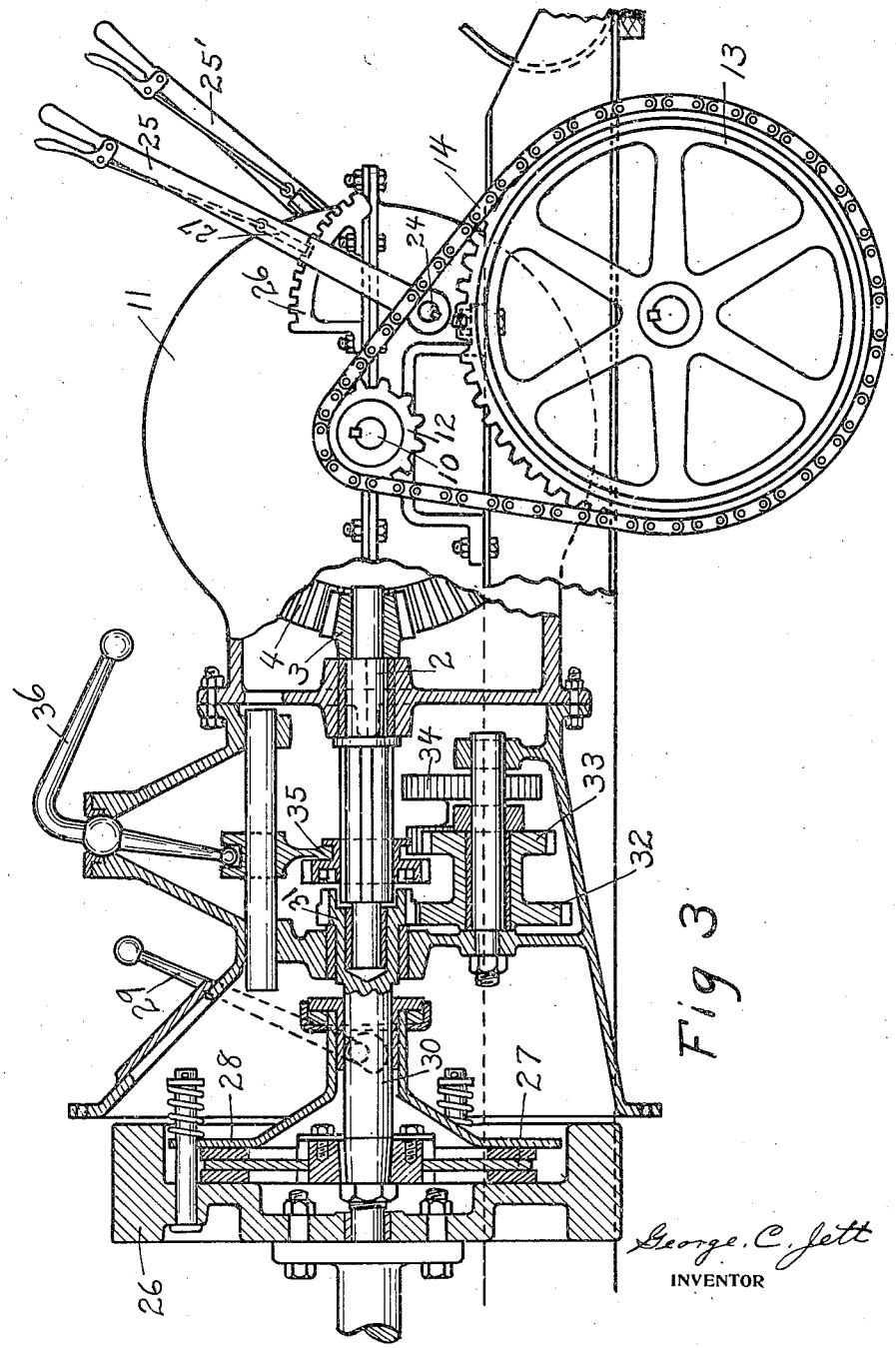

UNITED STATES PATENT OFFICE.

GEORGE C. JETT, OF MILWAUKEE, WISCONSIN, ASSIGNOR, BY MESNE ASSIGNMENTS, OF TWO-FIFTHS TO WALTER H. STIEMKE, OF MILWAUKEE, WISCONSIN.

DIFFERENTIAL MECHANISM.

1,423,941.        Specification of Letters Patent.        Patented July 25, 1922.

Application filed October 31, 1918. Serial No. 260,581.

*To all whom it may concern:*

Be it known that I, GEORGE C. JETT, a citizen of the United States, residing at Milwaukee, in the county of Milwaukee and State of Wisconsin, have invented new and useful Improvements in Differential Mechanism, of which the following is a specification.

My invention relates to that type of differential mechanism embodying a controlling means for effectively distributing the power derived from the driving means to either or both of the driven parts, and in a general way the object of my invention is to provide a differential mechanism which shall possess the advantages of the differentials such as are disclosed in my prior reissued Patent No. 13,634 of October 21, 1913, and in my copending application Ser. No. 238,977, filed June 8, 1918, without necessitating the use of the worm control gears and the parts associated therewith.

My invention may be employed to advantage in that type of motor vehicles in which the steering is accomplished by controlling the relatve speeds of the traction members on either side of the vehicle and, in fact, one of the more specific objects of my invention is to provide a differential of the class referred to which may be readily substituted for any of the standard types of differentials in vehicles of this character without necessitating further constructive changes in the transmission.

Another object of my invention is to provide a differential mechanism embodying a novel and simplified means for securely holding in fixed position certain parts of the differential mechanism in order to insure actuation of the traction members on both sides of the vehicle at the same speed so as to maintain a straight line travel of the vehicle, even though one of the traction members should encounter an obstruction.

Another object of the invention is to provide independently operated means for controlling the rotation of the parts actuated by the differential and by which means, when my invention is applied to a vehicle, the traction members themselves may be at all times under the direct control of the operator to more effectively turn the vehicle or to control the forward or reverse movement thereof as a whole.

These, together with such other objects and advantages as may hereinafter appear, or are incident to my invention, I attain by means of a construction, illustrated in preferred form in the accompanying drawings.

Figure 3 is a side elevation, partly in section, of a portion of a motor vehicle, illustrating in a general way the manner in which my invention may be applied thereto.

Figure 1:
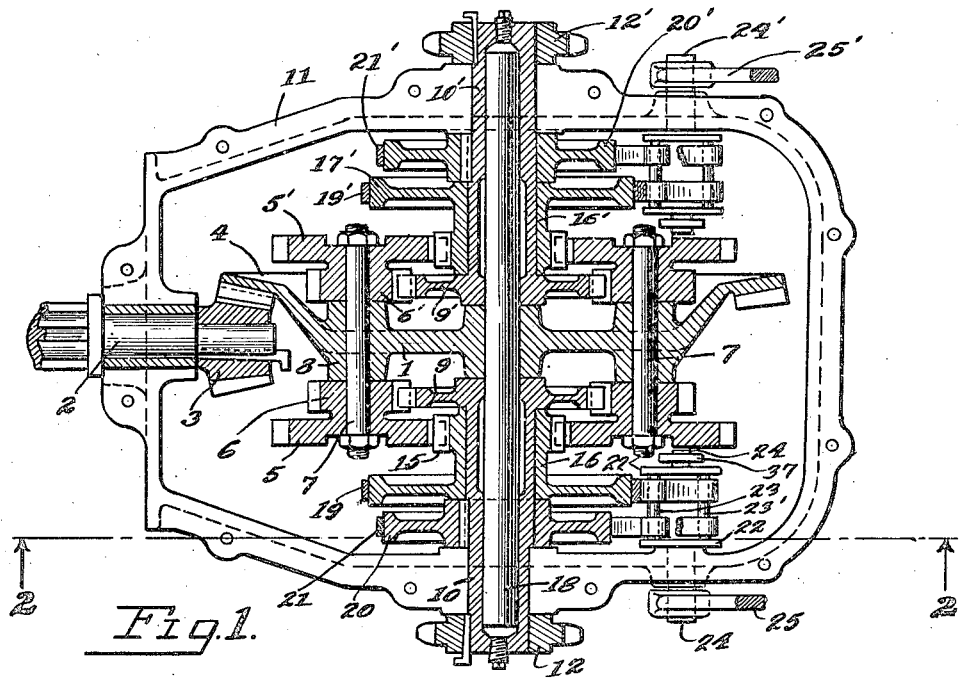
Figure 1 is a horizontal section through the center of a differential mechanism embodying the features of my invention.
Figure 2:
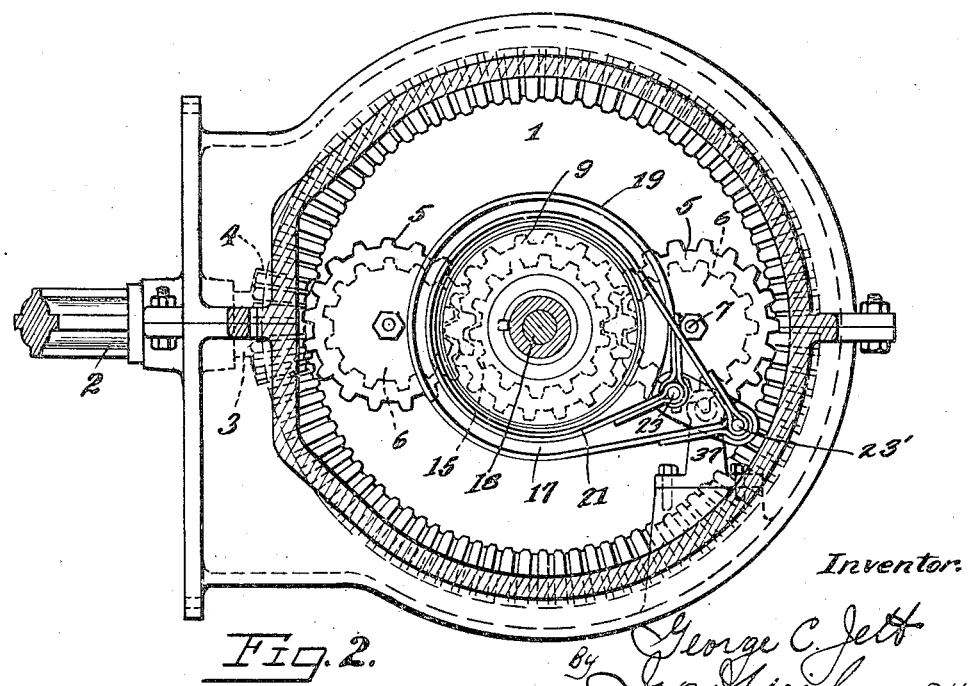
Figure 2 is a vertical section substantially on line 2—2 of Fig. 1 and illustrating more particularly a form of brake mechanism which may be employed.

My invention may include the usual type of planetary gearing, including web member 1 actuated by drive shaft 2 through pinion 3 and bevel gear 4, and carrying two sets of pinions 5—6 and 5'—6' which are mounted for rotation upon the opposite ends of each of the plurality of shafts 7 mounted in bearings 8, formed on said web member.

It will be noted that in the particular embodiment illustrated, pinions 5—6 and 5'—6' of each pair are integrally connected so as to rotate together, but that the separate pairs are independently rotatable. Pinions 6—6' are both smaller than pinions 5—5' and are constantly in mesh with pinions 9—9', respectively, fixed to hollow shafts 10—10', which will be hereinafter referred to as the driven shafts or members. These hollow shafts 10—10' are mounted for independent rotation in suitable bearings in the frame or housing 11, and keyed to the outer end of each of said shafts is a sprocket wheel 12 or 12', each of which is operatively connected to a tractor sprocket, such as shown at 13 in Fig. 3, by means of a sprocket chain 14, or any other convenient means.

Pinions 5 and 5' are each constantly in mesh with corresponding pinions 15 and 15', fixed to sleeves 16 and 16', respectively, which are mounted for rotation about the hollow shafts 10—10' and carry brake drums 17 and 17', keyed thereto.

Shaft 18, rotatably mounted in suitable bearings in the hollow shafts 10—10', serves to keep said shafts in rigid alignment and also to form a bearing for the web member 1 rotatably supported thereon.

By this construction, web member 1 carrying the gears 5—6 and 5'—6', is rotated about shaft 18 by means of the driving shaft 2, and, due to the fact that the diameter of gears 6—6' is different from that of gears 5—5', such rotation of the web member 1 will cause relative rotation between hollow shafts 10—10' and the corresponding sleeves 16—16', but in order to deliver power to either of shafts 10—10', it is necessary to resist the rotation of the corresponding sleeve members 16—16'. In other words, unless member 16 or 16' be restrained in its rotation, pinion 6 or 6' would idly roll around gearing 9 or 9' without applying any pressure thereon.

It will be further understood that, although pinions 5—6 and 5'—6' are moved in their orbital path at the same angular velocity by the driving shaft 2, the effect produced thereby upon their corresponding driven shafts 10—10' is dependent entirely upon the magnitude of the resistance offered to the rotation of sleeves 16—16', due to the fact that the rotation of pinions 5—6 about one end of each of shafts 7 is wholly independent of the rotation of pinions 5'—6' about the other end of each of said shafts.

The resistance to the rotation of either of sleeves 16 or 16' may be accomplished by means of brake bands herein shown, applied to the brake drums 17—17', respectively, hereinabove referred to, independently controlled by means hereinafter described.

In addition to the means just described for controlling the actuation of the hollow shafts 10—10', it has been found expedient to provide a control means for resisting the rotation of said shafts. For instance, in the application of my differential to motor vehicles of that type in which the steering is accomplished by controlling the relative speeds of the traction members on either side of the vehicle, it has been found that a turning movement may be accomplished by merely delivering more power to the traction member on one side than to the one on the other side, but it is obvious that, in addition to this, by actually retarding the movement of the traction member which is receiving the lesser amount of power, a sharper turning movement is accomplished.

For this purpose a brake mechanism is employed in connection with my improved differential mechanism and by means of which the rotation of either or both of the driven shafts 10—10' may be restrained. Such brake mechanism may include brake drums 20—20' keyed to shafts 10—10', respectively, brake bands 21—21' associated therewith, and control mechanism therefor which is hereinafter described.

Since I employ a separate brake mechanism for controlling the operation of each of the driven shafts 10—10', and, in view of the fact that both are identical in structure and function, it is believed that a description of the one will suffice for both.

Each of these brake mechanisms may include a rockable frame, comprising side plates 22—22' connected by pins 23—23' and provided with trunnions 24—24', journaled, respectively, in the side wall of the frame or housing 11, and in a suitable bracket 37. Brake band 19 is looped around brake drum 17 and one end thereof is pivotally secured to pin 23 of this rockable frame, while the other end is pivotally secured to the other pin 23'; and brake band 21 is looped around brake drum 20 and has one end pivotally secured to pin 23', while the other end is pivotally secured to pin 23. It will be noted that pins 23—23' lie on opposite sides of the axis of rotation of trunnions 24—24' and the arrangement of the brake bands is such that a rocking movement of the rockable frame in one direction will simultaneously cause a tensioning of one brake band and a loosening of the other, while a rocking movement in the other direction will cause a loosening of the first mentioned brake band and a tensioning of the other.

This rockable frame may be actuated and controlled by means of a lever 25 keyed to journal 24 thereof. This lever is one of ordinary type, the position of which may be adjustably fixed by means of the usual quadrant 26 and pawl mechanism 27. A similar lever 25' may be employed to operate the brake mechanism for controlling shaft 10' on the other side of the differential.

As hereinbefore pointed out, the differential mechanism herein disclosed may be applied to a motor vehicle of any standard type, for instance such as that partially disclosed in Fig. 3 of the drawings. Such a vehicle may include a fly wheel 26, connected with a suitable source of power and forming part of a clutch mechanism, including the usual friction plate 27, pressure mechanism 28 and lever 29 for controlling the operation of the same.

Driving shaft 2, as shown in Fig. 3, is connected to this clutch mechanism by means of shaft 30 carrying pinion 31 constantly in mesh with gear wheel 32, operatively connectable with spur gear 33 and with reverse pinion 34, with either of the latter two of which slidable gear 35 may be connected for a forward or reverse drive. The position of gear 35 is controlled by the lever 36.

In view of the fact that these clutch and change speed mechanisms form no part of the present invention and comprise structures well known in the art, it is believed that a further detailed description of the same is unnecessary.

It is believed that the construction and operation of the differential mechanism herein disclosed will be clearly understood from the foregoing description, but it might be well to describe the operation of the same and the effect produced thereby when applied to a motor vehicle.

Assuming that the engine is running, causing rotation of fly wheel 26, and that the clutch and change speed mechanisms are so connected as to cause the rotation of shaft 2, it will be understood that so long as brake bands 19—19' are loose on their corresponding drums 17—17', no power will be delivered to the driven shafts 10—10' and that, therefore, the vehicle will remain at rest. As soon, however, as both levers 25—25' have been shifted to a position such that brake bands 19—19' will be put under tension, rotation of the sleeves 16—16' will be resisted and power will be delivered to the driven shafts 10—10' in proportion to the magnitude of the resistance against the rotation of these sleeves, and the vehicle will move in a forward direction as a speed proportionate to the amount of power delivered to the driven shafts.

If, now, it be desirable to cause a turning of the vehicle, for instance to the right, lever 25' is moved to such position as to relieve the tension in brake band 19', thus reducing the pressure or pull of pinions 6' upon corresponding driven member 10' and causing all the power to be delivered to driven member 10 and the traction means on the left hand side of the vehicle, thus obviously causing a turning movement to the right. If a sharper turn is desired, this may be accomplished by shifting lever 25' further in the same direction, thus causing the tensioning of brake band 21' and thus actually resisting the rotation of driven shaft 10' and the motion of the traction mechanism connected therewith.

Of course, it is understood that in addition to their function of more effectively causing a turning of the vehicle from a straight line travel, brake mechanism 20—21 and 20'—21' may serve the purposes of an ordinary brake in a motor vehicle to resist the forward or backward movement of the same when such mechanisms are simultaneously put into operation.

It will also be noted that brake bands 19—19' may be simultaneously placed under such tension that they will positively prevent the rotation of drums 17—17' and their corresponding sleeve members 16—16' in order to insure the rotation of the driven shafts 10—10' at the same velocity, thereby causing the vehicle to move in a straight line, even though either of the traction members on the opposite sides thereof should strike an obstruction.

It is, of course, to be understood that the foregoing description, in connection with the accompanying drawings, is intended for the sole purpose of conveying a clear understanding of the construction and operation of one specific embodiment of my invention, and should not, therefore, be considered in any sense as a limitation upon such invention, the scope of which is defined in the following claims.

What I claim is:—

1. In a driving mechanism the combination of a driving means, a driven shaft, differential mechanism between said driving means and said driven shaft, including a rotatable member and means for controlling the rotation of said member, means for controlling the rotation of said shaft, and a single means for controlling both of said controlling means.

2. In a differential mechanism, the combination of a casing, a transversely extending shaft stationarily mounted therein, a pair of hollow shafts rotatably mounted on said stationary shaft, a driving gear mounted on said stationary shaft between said hollow shafts, a driven member and a gear mounted upon opposite ends of each of said hollow shafts, a sleeve rotatably mounted upon each hollow shaft, a gear and a driven member fixed to each sleeve, planetary gearing carried by said driving gear and meshing with the gears on said hollow shafts and said sleeves respectively, means for applying a braking action to the driven members carried by said sleeves, means for applying a braking action to the driven members carried by said hollow shafts, and mechanism for controlling the operation of said braking means.

3. In a differential mechanism, the combination with a main gear, of a shaft provided with a driven member and a gear, a sleeve on said shaft provided with a second gear, planetary gearing comprising gears in mesh with said gears and tending during rotation of the main gear to impart movement to said sleeve relatively to said shaft, a positive acting holding means for said sleeve operating to resist such relative movement and thereby permit rotary movement of the driven member, a braking means for said shaft and a common means for controlling said holding and braking means.

4. In a differential mechanism, the combination with a main gear, of a pair of shaft sections axially aligned at the sides of said main gear and each provided with a sleeve loosely mounted thereon, planetary gearing tending to impart rotary movement to said sleeves relatively to the sections during main gear rotation, a holding means constructed and arranged to resist such relative movement and thereby permit rotary movement of said shaft sections, a braking means capable of actuation to effect a braking influence upon either or both of said sections and means for causing the release of said holding means when said braking means is applied.

5. In a differential mechanism, the combination with a main gear, of a pair of shaft sections axially aligned at the sides of said main gear and each provided with a sleeve loosely mounted thereon, planetary gearing tending to impart rotary movement to said sleeves during main gear rotation, a holding means constructed and arranged to resist such relative movement and thereby permit rotary movement of said shaft sections, and a braking means capable of actuation to effect a braking influence upon either or both of said sections, parts of both said means associated at one side of the main gear to simultaneously brake a shaft section and release the sleeve on said section whereby to materially increase the speed ratio of the shaft section at the other side of the main gear.

6. In a differential mechanism, the combination of a casing, a transversely extending shaft mounted therein, a driving gear on said shaft, a hollow shaft rotatably mounted in said casing at each side of said driving gear, a driven member and a gear mounted upon opposite ends of each of said hollow shafts, a sleeve rotatably mounted upon each hollow shaft, a gear and a driven member fixed to each sleeve, planetary gearing carried by said driving gear and meshing with said gears on said hollow shafts and sleeves respectively, and means for applying a braking action to the driven members carried by said sleeves.

7. In a differential mechanism, the combination of a casing, a pair of shafts mounted therein, a driving gear disposed between said shafts, a driven member and a gear fixed to the outer and inner ends respectively of each shaft, a sleeve rotatably mounted upon each shaft, a gear and a driven member fixed to each sleeve, planetary gears carried by said driving gear and meshing with the gears on said shafts and sleeves, and means for applying a braking action to each of said sleeves and shafts at will.

In witness whereof, I have hereunto subscribed my name.

GEORGE C. JETT.